(12) United States Patent
Belter et al.

(10) Patent No.: US 11,586,207 B1
(45) Date of Patent: *Feb. 21, 2023

(54) MARINE PROPULSION SYSTEM AND METHOD FOR PREVENTING COLLISION OF MARINE PROPULSION DEVICES

(71) Applicant: Brunswick Corporation, Mettawa, IL (US)

(72) Inventors: David J. Belter, Oshkosh, WI (US); Matthew W. Snyder, Fond du Lac, WI (US); Brad E. Taylor, Dallas, TX (US)

(73) Assignee: Brunswick Corporation, Mettawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,803

(22) Filed: Apr. 28, 2022

Related U.S. Application Data (63) Continuation of application No. 16/152,554, filed on Oct. 5, 2018, now Pat. No. 11,347,223.

(51) Int. Cl.
*G05D 1/02* (2020.01)
*B63H 25/42* (2006.01)
*B63H 25/02* (2006.01)

(52) U.S. Cl.
CPC .......... *G05D 1/0208* (2013.01); *B63H 25/02* (2013.01); *B63H 25/42* (2013.01); *B63H 2025/026* (2013.01)

(58) Field of Classification Search
CPC ............ G05D 1/0208; B63H 2025/026; B63H 25/42; B63H 25/02
See application file for complete search history.

(56) References Cited

U.S. PATENT DOCUMENTS

| | | |
|---|---|---|
| 7,524,219 B2 | 4/2009 | Torrangs et al. |
| 8,113,892 B1 | 2/2012 | Gable et al. |
| 8,246,398 B2 | 8/2012 | Inaba |
| 8,246,399 B2 | 8/2012 | Inaba |
| 8,818,587 B1 | 8/2014 | Arbuckle et al. |
| 9,139,276 B2 | 9/2015 | Ito |

(Continued)

FOREIGN PATENT DOCUMENTS

| | | |
|---|---|---|
| JP | 2002068086 A | 3/2002 |
| JP | 2006321422 A | 11/2006 |

(Continued)

OTHER PUBLICATIONS

Lemancik et al., "Systems and Methods for Enhancing Features of a Marine Propulsion System," U.S. Appl. No. 15/378,778, filed Dec. 14, 2016 (drawings, specification, and claims only).

(Continued)

*Primary Examiner* — Hunter B Lonsberry
*Assistant Examiner* — Matthew J. Reda
(74) *Attorney, Agent, or Firm* — Andrus Intellectual Property Law, LLP (57) ABSTRACT

A marine propulsion system for a marine vessel has a first marine propulsion device coupled to the marine vessel and a second marine propulsion device coupled to the marine vessel. The first marine propulsion device has a first engine controlled by a first electronic control module. The second marine propulsion device has a second engine controlled by a second electronic control module. In response to the first marine propulsion device being keyed ON, the second electronic control module of the second marine propulsion device is turned ON.

16 Claims, 4 Drawing Sheets

(56) References Cited

U.S. PATENT DOCUMENTS

| | | |
|---|---|---|
| 9,284,032 B1 | 3/2016 | Snyder et al. |
| 9,643,698 B1 | 5/2017 | Andrasko et al. |
| 2008/0254690 A1 | 10/2008 | Kishibata |
| 2010/0248560 A1 | 9/2010 | Ito et al. |
| 2010/0286891 A1 | 11/2010 | Huang et al. |
| 2014/0329422 A1 | 11/2014 | Ito |
| 2018/0215455 A1 | 8/2018 | Takewaki et al. |
| 2018/0328301 A1 | 11/2018 | Taylor et al. |
| 2019/0344869 A1 | 11/2019 | Chan et al. |
| 2019/0353093 A1 | 11/2019 | Ito et al. |

FOREIGN PATENT DOCUMENTS

| | | |
|---|---|---|
| JP | 2008201220 A | 9/2008 |
| JP | 2011093497 A | 5/2011 |

OTHER PUBLICATIONS

Belter et al., "Marine Propulsion System and Method for Preventing Collision of Marine Propulsion Devices," U.S. Appl. No. 16/152,554, filed Oct. 5, 2018 (drawings, specification, and claims only).

MARINE PROPULSION SYSTEM AND METHOD FOR PREVENTING COLLISION OF MARINE PROPULSION DEVICES

CROSS-REFERENCE TO RELATED APPLICATION

This application is a continuation of U.S. application Ser. No. 16/152,554, filed Oct. 5, 2018, the entirety of which is incorporated by reference herein.

FIELD

The present disclosure relates to marine vessels having marine propulsion systems including two or more marine propulsion devices.

BACKGROUND

U.S. Pat. No. 8,818,587 discloses methods and systems for controlling movement of at least one propulsion unit on a marine vessel. The method comprises plotting a first plurality of points representing a first surface of a first propulsion unit and plotting a second plurality of points representing a second surface. The method further comprises limiting movement of at least the first propulsion unit such that the first surface does not come within a predetermined distance of the second surface during said movement.

Unpublished U.S. patent application Ser. No. 15/378,778, filed Dec. 14, 2016, discloses a marine propulsion system including an outboard motor. The outboard motor has a cowl covering an internal combustion engine that is coupled to and powers a propeller. A motion sensor and an orientation sensor are coupled to the outboard motor, such as to the engine or the cowl. A control module is in signal communication with the motion sensor and the orientation sensor. The motion sensor and orientation sensor respectively provide information regarding an acceleration and an orientation of the engine or the cowl to the control module. A direction sensor and a GPS receiver may also be provided on the engine or the cowl, and may also be in signal communication with the control module. Information regarding the vessel's acceleration, orientation, direction, and global position can be used to control features of the propulsion system.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a marine propulsion system for a marine vessel includes a first marine propulsion device rotatable with respect to the marine vessel about at least one of a first steering axis and a first tilt-trim axis and a second marine propulsion device rotatable with respect to the marine vessel about at least one of a second steering axis and a second tilt-trim axis. A first control module controls operation of the first marine propulsion device, and a second control module controls operation of the second marine propulsion device. In response to one of the first and second marine propulsion devices being commanded to rotate about at least one of its respective first or second steering axis and its respective first or second tilt-trim axis, the respective first or second control module of the other of the first and second marine propulsion devices is turned ON.

According to another example of the present disclosure, a method for a marine propulsion system for a marine vessel is carried out by a control module and includes determining at least one of the following:
(a) whether a first marine propulsion device rotatable with respect to the marine vessel about at least one of a first steering axis and a first tilt-trim axis is keyed ON;
(b) whether a second marine propulsion device rotatable with respect to the marine vessel about at least one of a second steering axis and a second tilt-trim axis is keyed ON;
(c) whether the first marine propulsion device is commanded to rotate about at least one of its first steering axis and its first tilt-trim axis; and
(d) whether the second marine propulsion device is commanded to rotate about at least one of its second steering axis and its second tilt-trim axis.

In response to at least one of (a), (b), (c), and (d) being true, the method includes turning on a first control module controlling operation of the first marine propulsion device and a second control module controlling operation of the second marine propulsion device.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

Figure 1:
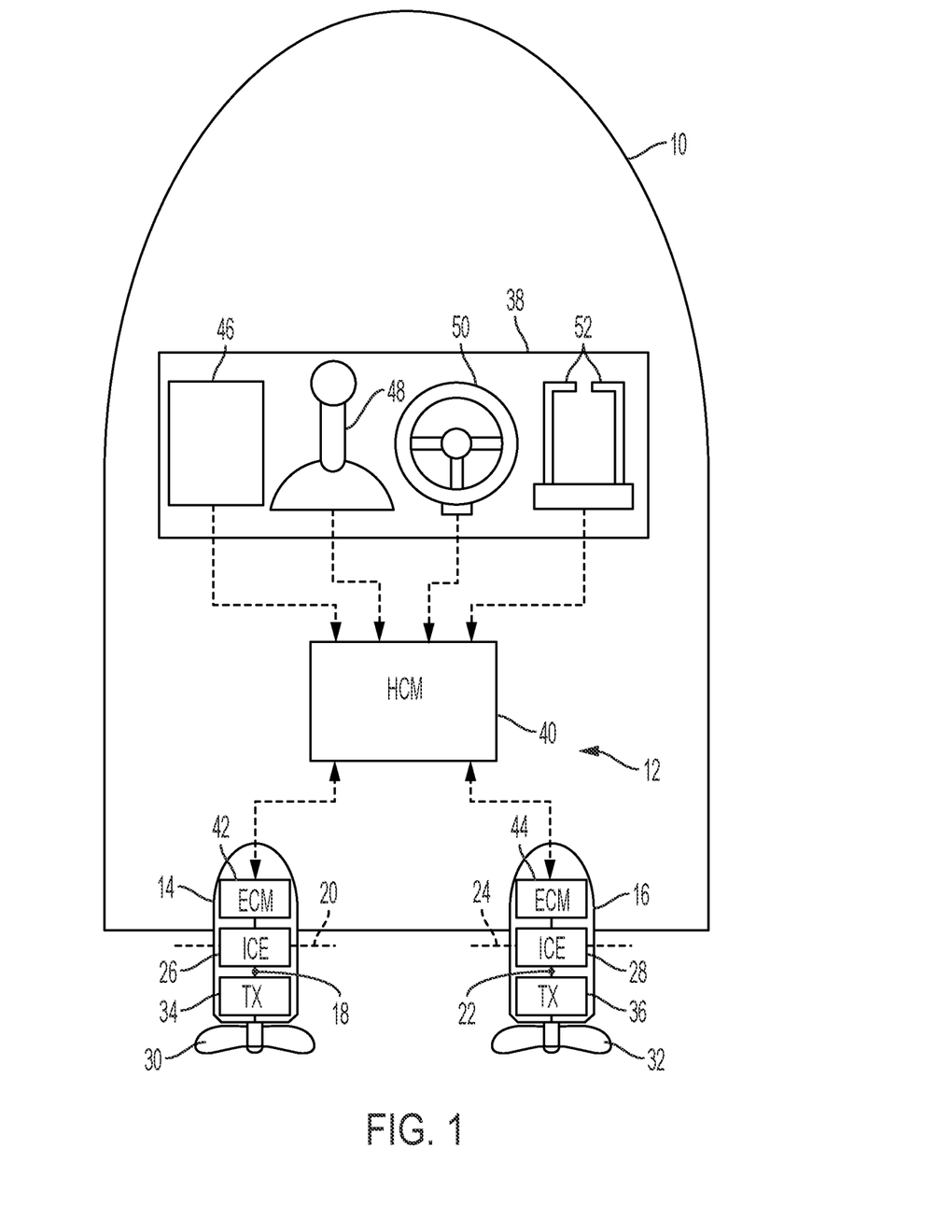
FIG. 1 illustrates a marine vessel having a marine propulsion system.

FIG. 1 illustrates a marine vessel 10 having a marine propulsion system 12 including a first marine propulsion device 14 and a second marine propulsion device 16. The first marine propulsion device 14 is rotatable with respect to the marine vessel 10 about at least one of a first steering axis 18 and a first tilt-trim axis 20. The second marine propulsion device 16 is rotatable with respect to the marine vessel 10 about at least one of a second steering axis 22 and a second tilt-trim axis 24. As is known, the first and second propulsion devices 14, 16 produce first and second thrusts to propel the marine vessel 10 by way of first and second engines 26, 28 powering first and second propellers 30, 32 via first and second transmissions 34, 36, respectively. As illustrated in FIG. 1, the first and second marine propulsion devices 14, 16 are outboard motors, but they could alternatively be inboard motors, stern drives, jet drives, or pod drives. In the example in which the marine propulsion devices 14, 16 are outboard motors, the first and second steering axes 18, 22 are generally vertically oriented when the marine propulsion devices 14, 16 are in a neutral trim position, and the first and second tilt-trim axes 20, 24 are generally horizontally oriented. In one example, the gear cases of the outboard motors are steerable independently of the upper cowls and midsections of the outboard motors.

The marine propulsion system 12 also includes various control elements for controlling marine vessel and marine propulsion device functions, such as, but not limited to, operational mode, direction, speed, steering, tilt, and trim. For example, the marine propulsion system 12 comprises an operation console 38 (helm) in signal communication with one or more control modules, such as for example a helm control module (HCM) 40 and electronic control modules (ECM) 42, 44 associated with the respective marine propulsion devices 14, 16. The ECM 42 is a first control module controlling operation of the first marine propulsion device 14, while the ECM 44 is a second control module controlling operation of the second marine propulsion device 16. The ECMs 42, 44 may control the engines 26, 28 and transmissions 34, 36 of the marine propulsion devices 14, 16 as well as their steering and tilt-trim orientations. In other examples of the marine propulsion system 12, two HCMs are provided, one for each marine propulsion device 14, 16. See FIG. 3.

The operation console 38 includes a number of user input devices, such as an interactive display screen 46, a joystick 48, a steering wheel 50, and throttle/shift levers 52. Each of these input devices can be used to input commands to the HCM 40. The HCM 40 in turn communicates with the first and second propulsion devices 14, 16, for example, by communicating with the ECMs 42, 44. It should be understood that in alterative examples, the various input devices 46, 48, 50, 52 may communicate directly with the ECMs 42, 44. The interactive display screen 46 may have touch capabilities and/or be provided with an associated keypad or keyboard that allows an operator of the marine vessel 10 to input various commands and/or select various modes of operation associated with the marine vessel 10. The joystick 48 allows the operator to maneuver the marine vessel 10 forward and back, laterally side-to-side, and diagonally, as well as to rotate (yaw). The steering wheel 50 and throttle/shift levers 52 are used together to command a direction and magnitude of thrust from the marine propulsion devices 14, 16, as well as a direction of travel for the marine vessel 10. For example, rotation of the steering wheel 50 activates a transducer that provides a signal to the HCM 40 regarding a desired direction of the marine vessel 10. The HCM 40 in turn sends signals to the ECMs 42, 44, which in turn activate steering actuators 63, 64 (FIG. 2) to achieve a desired orientation of the marine propulsion devices 14, 16. The throttle/shift levers 52 send signals to the HCM 40 regarding the desired gear (forward, reverse, or neutral) of the transmissions 34, 36 and the desired rotational speed of the engines 26, 28. The HCM 40 in turn sends signals to the ECMs 42, 44, which in turn activate shift and throttle electromechanical actuators in the transmissions 34, 36 and engines 26, 28, respectively.

Figure 2:
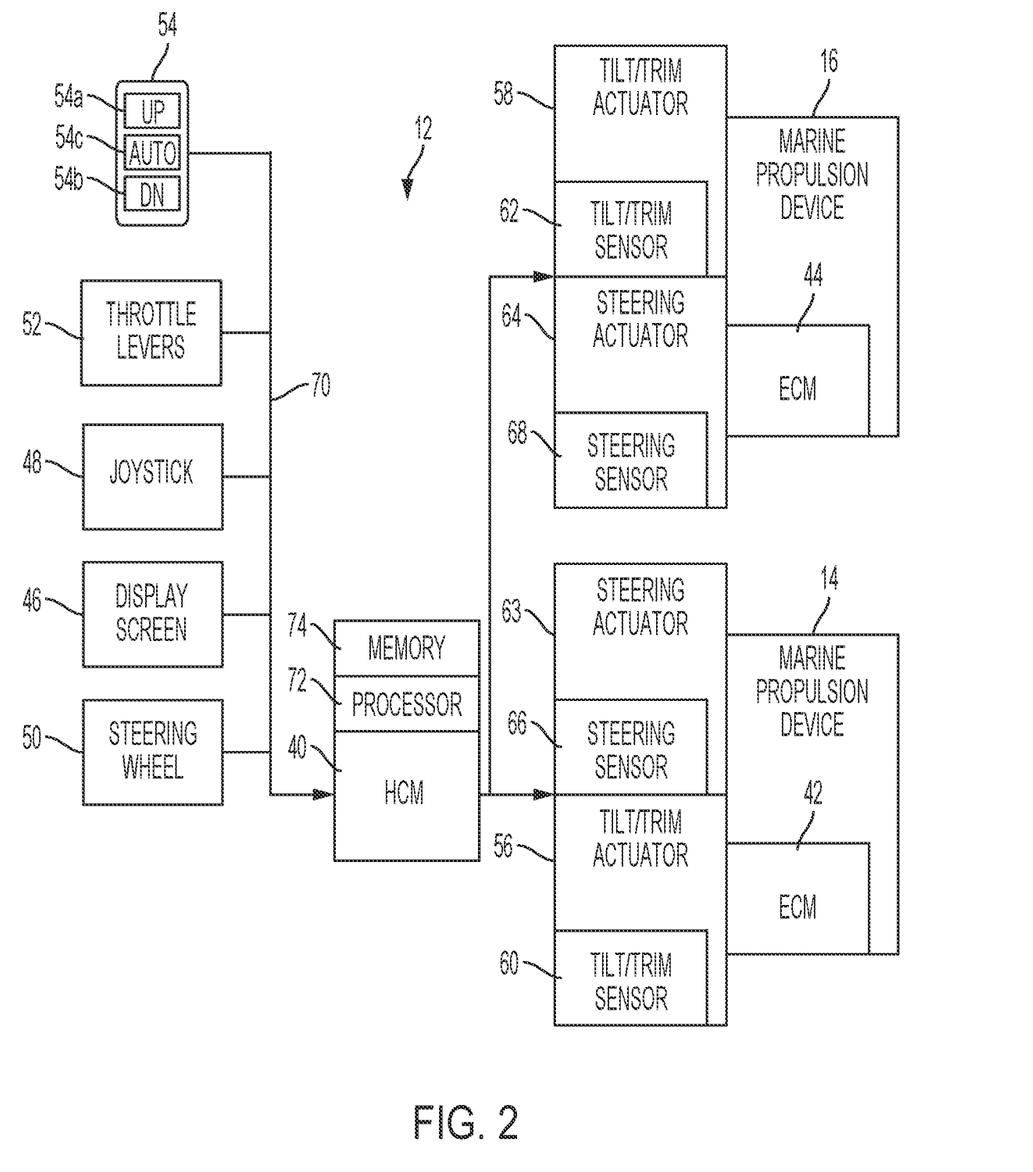
FIG. 2 is a schematic showing additional components of the marine propulsion system.

FIG. 2 shows a schematic of the marine propulsion system 12 with additional detail. In the example shown, the marine propulsion system 12 includes the above-mentioned throttle/shift levers 52, joystick 48, interactive display screen 46, steering wheel 50, HCM 40, marine propulsion devices 14, 16, and ECMs 42, 44. Additionally, a keypad 54 is provided at the operation console 38, which allows the operator to command the marine propulsion devices 14, 16 to tilt and trim about their respective tilt-trim axes 20, 24. For example, the operator can press the UP button 54a to rotate the marine propulsion device 14, 16 up away from the transom of the marine vessel 10. The operator can press the DOWN button 54b to rotate the marine propulsion device 14, 16 down toward the transom. The operator can instead select an AUTO button 54c to automatically trim the marine propulsion devices 14, 16 according to predefined algorithms based on vessel and/or engine speed, vessel attitude in the water, etc. In one example, two keypads 54 are provided, one for controlling the tilt and trim position of each respective marine propulsion device 14, 16. In some examples, separate buttons might be provided for tilting the marine propulsion devices 14, 16 than for trimming them, it being understood that a tilt angle of a marine propulsion device is generally greater than a maximum trim angle thereof. For example, the maximum trim angle might be one at which the propeller 30 or 32 is at a functional depth in the water for propelling the marine vessel 10, while the tilt angles above this are used when towing the marine vessel 10 or transporting it by land.

Tilt-trim actuators 56, 58, such as hydraulic or pneumatic piston-cylinders or electric linear actuators, are provided for rotating the marine propulsion devices 14, 16 about their tilt-trim axes 20, 24 in response to tilt-trim inputs to the keypad(s) 54. Note that in some examples, tilt actuators that are separate from the trim actuators 56, 58 might be provided. First and second tilt-trim sensors 60, 62 on the first and second marine propulsion devices 14, 16, respectively, measure first and second tilt-trim positions of the respective first and second marine propulsion devices 14, 16. For example, tilt-trim sensors 60, 62 measure relative positions between two parts associated with the tilt-trim actuators 56, 58. The tilt-trim sensors 60, 62 may be any type of sensor known to those having ordinary skill in the art, for example Hall Effect sensors or rheostat sensors. In another example, the first and second tilt-trim sensors 60, 62 are 3-axis accelerometers. The accelerometers may be linear and/or angular accelerometers. In one example, the accelerometers are MEMS accelerometers. In still another example, 3-axis gyrometers are used to measure the tilt-trim position of each marine propulsion device 14, 16. The gyrometers detect changes in rotational attributes of the marine propulsion devices 14, 16, for example by measuring changes in rate of rotation (i.e., angular velocity). The gyrometers may be MEMS gyrometers, dynamically tuned gyrometers, or any other type of gyrometer known to those having ordinary skill in the art.

A steering actuator 63, 64, such as a hydraulic, pneumatic, or electric actuator, is provided for steering each marine propulsion device 14, 16 in response to inputs from the joystick 48 or the steering wheel 50. First and second steering sensors 66, 68 on the first and second marine propulsion devices 14, 16, respectively, measure first and second steering positions of the respective first and second marine propulsion devices 14, 16. The steering sensors 66, 68 may also be Hall Effect sensors or potentiometers. In other examples, a steering sensor is also provided at the steering wheel 50 for additional steering information.

FIG. 2 shows an instance in which there are only two marine propulsion devices 14, 16, but it should be understood that similar actuators and sensors are provided for each marine propulsion device if more than two marine propulsion devices are provided on the marine vessel 10. Additionally, note that if the first and second marine propulsion devices 14, 16 are pod drives or inboard motors, they do not tilt or trim, and tilt/trim sensors and actuators are not provided, in which case the algorithms described herein below utilize steering position information rather than both steering position information and tilt/trim position information.

The control modules, including HCM 40 and ECMs 42, 44, are programmable and each includes a processor and a memory, although for purposes of simplicity the processor 72 and memory 74 are shown in conjunction with HCM 40 only. The control modules 40, 42, 44 can be located anywhere in the marine propulsion system 12 and/or located remote from the marine propulsion system 12 and can communicate with various components of the marine vessel 10 via a peripheral interface and wired and/or wireless links. Portions of the method disclosed herein below can be carried out by a single control module or by several separate control modules in conjunction with one another.

In some examples, each control module 40, 42, 44 may include a computing system that includes a processing system, storage system, software, and input/output (I/O) interfaces for communicating with peripheral devices. The systems may be implemented in hardware and/or software that carries out a programmed set of instructions. For example, the processing system loads and executes software from the storage system, such as software programmed with a global wake method, which directs the processing system to operate as described herein below in further detail. The computing system may include one or more processors, which may be communicatively connected. The processing system can comprise a microprocessor, including a control unit and a processing unit, and other circuitry, such as semiconductor hardware logic, that retrieves and executes software from the storage system. The processing system can be implemented within a single processing device but can also be distributed across multiple processing devices or sub-systems that cooperate according to existing program instructions. The processing system can include one or many software modules comprising sets of computer executable instructions for carrying out various functions as described herein.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The storage system can comprise any storage media readable by the processing system and capable of storing software. The storage system can include volatile and non-volatile, removable and non-removable media implemented in any method or technology for storage of information, such as computer-readable instructions, data structures, software program modules, or other data. The storage system can be implemented as a single storage device or across multiple storage devices or sub-systems. The storage system can include additional elements, such as a memory controller capable of communicating with the processing system. Non-limiting examples of storage media include random access memory, read-only memory, magnetic discs, optical discs, flash memory, virtual and non-virtual memory, various types of magnetic storage devices, or any other medium which can be used to store the desired information and that may be accessed by an instruction execution system. The storage media can be a transitory storage media or a non-transitory storage media such as a non-transitory tangible computer readable medium.

The control modules 40, 42, 44 communicate with one another and with the one or more components of the marine propulsion system 12 via the I/O interfaces and a communication link 70, which can be a wired or wireless link. The control modules 40, 42, 44 are capable of monitoring and controlling one or more operational characteristics of the marine propulsion system 12 and its various subsystems by sending and receiving control signals via the communication link 70. In one example, the communication link 70 is a controller area network (CAN) bus, but other types of links could be used. It should be noted that the extent of connections of the communication link 70 shown herein is for schematic purposes only, and the communication link 70 in fact provides communication between the control modules 40, 42, 44 and each of the peripheral devices noted herein, although not every connection is shown in the drawing for purposes of clarity.

As boaters demand more power on their boats, there has been a tendency to install more and/or larger marine propulsion devices on a single marine vessel. This is especially easy to do with an outboard motor, which does not require changes to the vessel's hull to install. Through research and development, the present inventors have determined that as more and larger marine propulsion devices are mounted on a single marine vessel's transom, the likelihood that they might interfere with one another while moving increases. The likelihood of interference (collision) increases when one or more of the marine propulsion devices is not turned ON. If all marine propulsion devices on the transom are turned ON and are manually controlled, they are generally all steered together. Although tilt/trim can be individually controlled, simultaneous steering is likely to prevent any collision. If all marine propulsion devices on the transom are turned ON and are automatically controlled, the automatic control algorithm is generally calibrated to prevent collision between the marine propulsion devices. However, if fewer than all of the marine propulsion devices are steered and/or tilted/trimmed (whether they are ON or not), the likelihood that those steered and/or tilted/trimmed marine propulsion devices will collide with a stationary marine propulsion device that is OFF increases, as the OFF marine propulsion device is not being steered simultaneously. Therefore, the present inventors have developed systems and methods for turning ON the ECM of an OFF marine propulsion device that is not steered and/or tilted/trimmed, so that the previously OFF marine propulsion device can report its position for comparison with the intended or anticipated position of the marine propulsion device that is being steered and/or tilted/trimmed.

Figure 3:
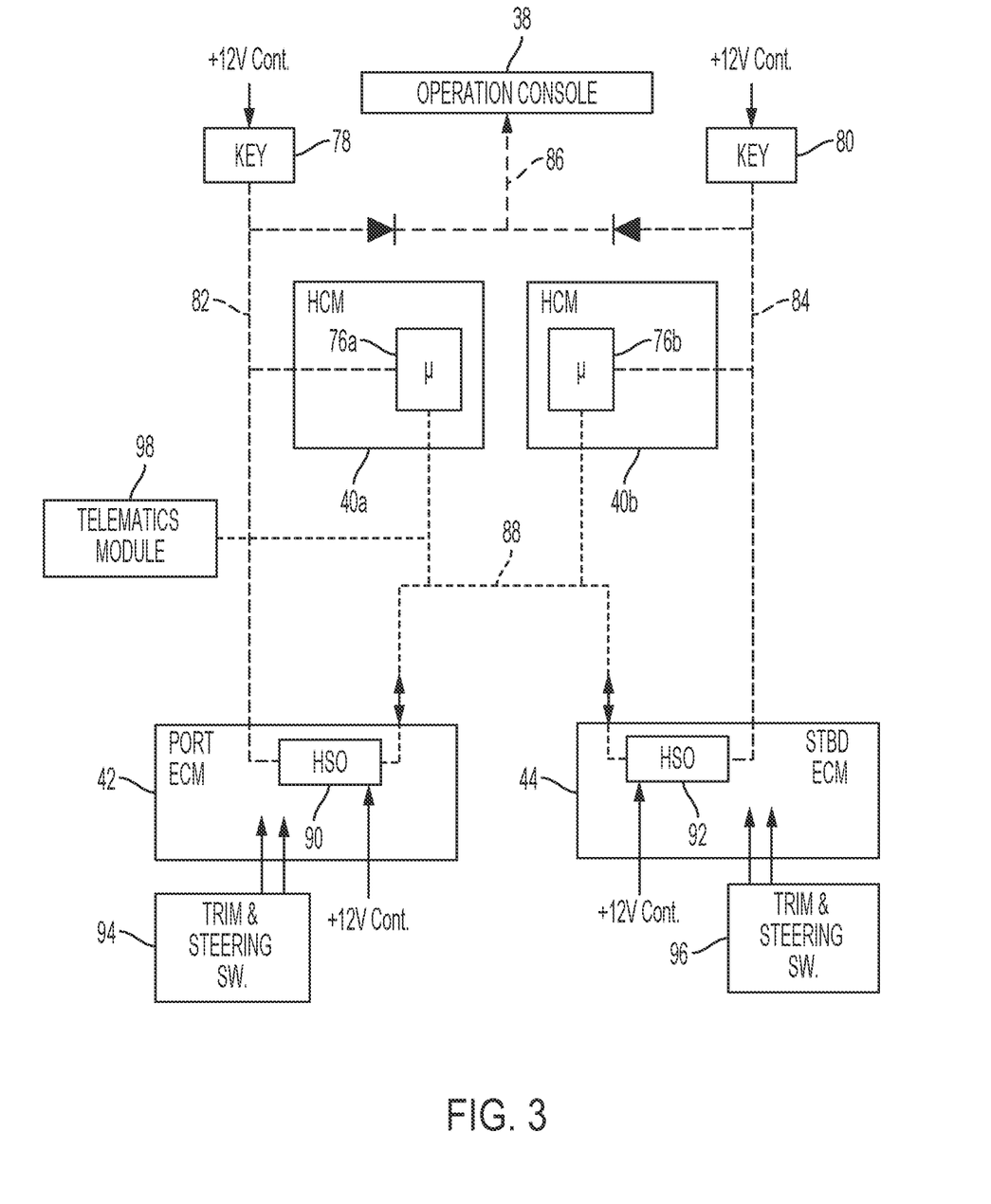
FIG. 3 is a schematic showing electrical connections between components of the marine propulsion system.

FIG. 3 shows an example in which two helm control modules 40a, 40b are provided, one associated with each marine propulsion device's ECM 42, 44. Each HCM 40a, 40b includes a microprocessor 76a, 76b in signal communication with a key input 78, 80 by way of respective lines 82, 84. The key inputs 78, 80 are initiated by the operator of the marine propulsion system 12 by, for example, inserting a key into a slot and turning the key within the slot to an ON position. Alternatively, a key fob can be brought near a key reader, and an ON button pressed or an ON touch screen selection made. The respective engines 26, 28 in each marine propulsion device 14, 16 can similarly be started by turning the respective keys to START positions, or by selecting respective START/STOP buttons or display screen options. It should be understood that each key input 78, 80 is individually associated with a respective ECM 42 or 44. For instance, key input 78 being turned ON will turn on (or "wake up") ECM 42, while key input 80 being turned ON will turn on ECM 44. The signals along lines 82 and 84 are interpreted by the respective ECMs 42, 44 as commands to turn their power ON and to provide normal steering, trim, diagnostic, and other functionality to the marine propulsion devices 14, 16.

When the key input is received from either 78 or 80, a signal is sent over line 86 to the operation console 38 and to each of the controls located there. Thus, the interactive display screen 46, joystick 48, steering wheel 50, and throttle/shift levers 52 are all woken up (provided with electrical power) in order that they may be used to input control signals to the HCMs 40a, 40b. Additionally, according to the present disclosure, in response to one of the first and second marine propulsion devices 14, 16 being keyed ON at key input 78 or 80, the respective first or second control module 42, 44 of the other of the first and second marine propulsion devices 14, 16 is turned ON. This is shown by the signal over line 88. The signal over line 88 is interpreted by the ECMs 42, 44 as a command to power ON, but, in one example, to provide communication only of specific parameters and control only of specific outputs, rather than to provide full functionality as if the ECM 42 or 44 had been keyed ON via line 82 or 84.

In the present example, each ECM 42, 44 has a high side output (HSO) 90, 92 capable of sending a +12V signal over line 88 to wake the other ECM 42, 44. The connection between the HSOs 90, 92 and the line 88 can be made internally to the respective ECM 42, 44 or in the respective marine propulsion device's wiring harness. In the present example, the ECM 42 or 44 that is keyed ON asserts the +12V output signal from HSO 90 or 92 over line 88 in response to receiving the respective input signal over line 82 or 84. Such an input/output causal chain can be accomplished by way of the microprocessors 76a, 76b, which are in signal communication with one another, or by way of an OR-gate diode circuit connecting the line 82 to the HSO 92 and the line 84 to the HSO 90.

Alternatively, in response to one of the first and second marine propulsion devices 14, 16 being commanded to rotate about at least one of its respective first or second steering axis 18, 22 and its respective first or second tilt-trim axis 20, 24 (see inputs 94, 96), the respective first or second control module 42, 44 of the other of the first and second marine propulsion devices 14, 16 is turned ON. In other words, the ECM 42 or 44 of the marine propulsion device 14 or 16 that is being commanded to turn, tilt, or trim will assert the +12V output signal over line 88 to provide power to the ECM 42 or 44 of the other marine propulsion device 14 or 16 that is not being commanded to turn, tilt, or trim. This "global wake" feature could be provided when the ECM of the steered or tilted/trimmed marine propulsion device is ON, but the ECM of the other marine propulsion device is OFF, or only when both ECMs 42, 44 are currently OFF, or even when the ECMs 42, 44 are both already ON. If both of the ECMs 42, 44 are OFF when the steering or tilt-trim command is received, in response to the one of the first and second marine propulsion devices 14, 16 being commanded to rotate about the at least one of its respective first or second steering axis 18, 22 and its respective first or second tilt-trim axis 20, 24, the respective first or second control module 42, 44 of the one of the first and second marine propulsion devices 14, 16 is turned ON. Note that when the ECMs 42, 44 are turned on, the corresponding engines 26, 28 are not necessarily started, unless they have otherwise been commanded to start. Note also that when an ECM is turned ON via a signal over line 88, certain functions are not turned on, such as fuel pumps, electrical loads, and diagnostics. This prevents the marine propulsion device 14 or 16 from using more energy than needed to report its steering and tilt/trim position, seeing as its alternator is not on (because the engine is not running) to recharge its battery.

Turning on the ECM 42 or 44 of the marine propulsion device 14, or 16 that is not keyed ON or that is not commanded to steer, tilt, or trim provides an advantage over known prior art because the relative positioning of the two marine propulsion devices 14, 16 can be compared in order to prevent collisions between the two marine propulsion devices 14, 16 and potential damage thereto. As noted herein above, the first and second control modules 42 44 receive the first and second steering positions and the first and second tilt-trim positions, respectively, from the first and second steering sensors 66, 68 and the first and second tilt-trim sensors 60, 62, respectively. However, the ECMs 42, 44 are only able to receive and communicate this information when the ECMs 42, 44 are powered ON. Thus, it is possible for ECM 42 to report the steering position and/or tilt-trim position of the first marine propulsion device 14 when it is powered ON, and for ECM 44 to report the steering position and/or tilt-trim position of the second marine propulsion device 16 when it is powered ON.

After steering and/or tilt-trim positions have been reported, in response to determining that rotating the one of the first and second marine propulsion devices 14, 16 about its respective first or second steering axis 18, 22 will cause the one of the first and second marine propulsion devices 14, 16 to collide with the other of the first and second marine propulsion devices 14, 16 based on at least one of the respective first or second steering position and the respective first or second tilt-trim position of the other of the first and second marine propulsion devices 14, 16, the one of the first and second marine propulsion devices 14, 16 is at least temporarily prevented from rotating about its respective first or second steering axis 18, 22. Similarly, in response to determining that rotating the one of the first and second marine propulsion devices 14, 16 about its respective first or second tilt-trim axis 20, 24 will cause the one of the first and second marine propulsion devices 14, 16 to collide with the other of the first and second marine propulsion devices 14, 16 based on at least one of the respective first or second steering position and the respective first or second tilt-trim position of the other of the first and second marine propulsion devices 14, 16, the one of the first and second marine propulsion devices 14, 16 is at least temporarily prevented from rotating about its respective first or second tilt-trim axis. In both instances, the requested or anticipated steering position or tilt-trim position of the one of the first and second marine propulsion devices 14, 16 that was commanded to rotate could also be taken into account and compared to the existing steering and/or tilt-trim position of the other of the marine propulsion devices 14, 16 that was not commanded to rotate.

In order to determine if the steering position and the tilt-trim position of the other of the first and second marine propulsion devices 14, 16 that was not commanded to rotate will present a potential collision problem, the measured steering positions and/or tilt-trim positions reported to each ECM 42, 44 need to be shared, i.e., the first and second control modules 42, 44 need to be in signal communication with each other. These measurements could be reported back to the microprocessors 76s, 76b of the HCMs 40a, 40b, either of which could determine if a collision is likely and output a command to the ECM 42 or 44 to temporarily prevent the marine propulsion device 14 or 16 from rotating. Alternatively, the ECMs 42, 44 could be directly communicatively connected to one another, and either ECM 42 or 44 could determine if a collision is likely and output a command to temporarily prevent the marine propulsion device 14 or 16 from rotating. Additionally or alternatively, these measurements could be relayed to a telematics module 98, which can also gather information about the number of hours the engines 26, 28 have been running, the voltage of batteries in each marine propulsion device 14, 16, the level of fuel in fuel tanks for each marine propulsion device 14, 16, etc. and provide this information to the operator via the interactive display screen 46. In one example, the telematics module 98 is the module that performs the comparisons noted herein and determines whether the marine propulsion devices 14, 16 will collide if a commanded steering or tilt-trim maneuver is carried out.

In other examples, instead of immediately preventing the marine propulsion device 14, 16 that was commanded to rotate from rotating at all, even temporarily, the marine propulsion device 14, 16 may be permitted to rotate in the direction of the steering and/or tilt-trim command until it reaches a position after which further rotation would cause collision with the other marine propulsion device 14, 16 that was not commanded to rotate. After the marine propulsion device 14 or 16 reaches this steering and/or tilt-trim limit, which is predetermined based on the position of the other marine propulsion device 14 or 16, the marine propulsion device 14 or 16 that was rotating may be temporarily prevented from further rotation. By way of example, if three marine propulsion devices are provided on the transom of the marine vessel 10, and only the middle marine propulsion device was steered and/or tilted/trimmed, the operator could be given an option (as described below) to steer the two outer marine propulsion devices outwardly and trim them up. If the operator chose not to undertake this action, the movement of the middle marine propulsion device could be automatically limited to moving within a boundary (limits) within which it would not collide with the two outer marine propulsion devices.

In either of the above instances, i.e., whether the marine propulsion device is temporarily preventing from rotating with or without rotating to a predetermined limit beforehand, the display screen 46 can be utilized to permit rotation thereafter. As shown in FIGS. 1 and 2, the display screen 46 is communicatively coupled to the first and second control modules 42, 44. An alert is generated on the display screen 46 in response to:
  (a) the one of the first and second marine propulsion devices 14, 16 being commanded to rotate about the at least one of its respective first or second steering axis 18, 22 and its respective first or second tilt-trim axis 20, 24; and
  (b) determining that rotating the one of the first and second marine propulsion devices 14, 16 about the at least one of its respective first or second steering axis 18, 22 and its respective first or second tilt-trim axis 20, 24 will cause the one of the first and second marine propulsion devices 14, 16 to collide with the other of the first and second marine propulsion devices 14, 16 based on at least one of the respective first or second steering position and the respective first or second tilt-trim position of the other of the first and second marine propulsion devices 14, 16.

As noted herein above, the determination in (b) may also be made based on the requested or anticipated first or second steering position and first or second tilt-trim position of the one of the first and second marine propulsion devices 14, 16 that was commanded to rotate.

In one example, the alert provides an option to trim the other of the first and second marine propulsion devices 14, 16 up. This allows the marine propulsion device that was not initially commanded to rotate to be moved up and out of the way of steering and tilting/trimming of the marine propulsion device that was initially commanded to rotate. This might be helpful if, for example, the primary steering actuator 63 or 64 on one of the marine propulsion devices 14 or 16 is not working, and a backup steering actuator is instead being used. Because backup steering actuators may be much slower than the primary steering actuator 63 or 64, the steering speed of the functioning primary steering actuator on the other marine propulsion device would be limited. An alert could let the operator know that if he or she trimmed the marine propulsion device with the non-functioning steering actuator up out of the way, full steering speed would be available from the remainder of the marine propulsion devices.

In another example, the alert provides an option to steer the other of the first and second marine propulsion devices 14, 16 away from the one of the first and second marine propulsion devices 14, 16 that was initially commanded to rotate. This allows the marine propulsion device that was not initially commanded to rotate to be moved laterally out of the way of steering and/or tilting/trimming of the marine propulsion device that was initially commanded to rotate.

In either example, the alert might allow the operator to select the corrective action directly from the interactive display screen 46. In other examples, the alert might instruct the operator to use the steering wheel 50 or joystick 48 to steer the other marine propulsion device 14, 16 out of the way, or to use the appropriate trim button 54a to trim the other marine propulsion device 14, 16 up out of the way. In still other examples, the display screen 46 might instruct the operator both to steer the other marine propulsion device 14, 16 outwardly and to trim the other marine propulsion device 14, 16 up. After the other marine propulsion device 14, 16 is steered and/or tilted/trimmed out of the way of the marine propulsion device 14, 16 that was initially commanded to rotate, the marine propulsion device that was initially commanded to rotate could be automatically rotated according to the initial steering and/or tilt-trim command. Alternatively, the display screen 46 may present the operator with an option to continue to steer and/or tilt-trim the marine propulsion device that was initially commanded to rotate according to the initial command, or may instruct the operator to again input the initial steering command via the joystick 48 or steering wheel 50 or to again input the initial tilt-trim command via the keypad 54. In still another example, the operator may be required to re-input the initial command without any prompts.

In yet another example, the other of the first and second marine propulsion devices 14, 16 that was not initially commanded to steer and/or tilt-trim is automatically trimmed up and steered away from the one of the first and second marine propulsion devices 14, 16 in response to:
   (a) the one of the first and second marine propulsion devices 14, 16 being commanded to rotate about the at least one of its respective first or second steering axis 18, 22 and its respective first or second tilt-trim axis 20, 24; and
   (b) determining that rotating the one of the first and second marine propulsion devices 14, 16 about the at least one of its respective first or second steering axis 18, 22 and its respective first or second tilt-trim axis 20, 24 will cause the one of the first and second marine propulsion devices 14, 16 to collide with the other of the first and second marine propulsion devices 14, 16 based on at least one of the respective first or second steering position and the respective first or second tilt-trim position of the other of the first and second marine propulsion devices.

As noted herein above, the determination in (b) may also be made based on the requested or anticipated first or second steering position and first or second tilt-trim position of the one of the first and second marine propulsion devices 14, 16 that was commanded to rotate. This embodiment may include automatic steering and/or tilting/trimming of the marine propulsion device that was initially commanded to rotate after the other marine propulsion device is moved out of the way. This embodiment could be accompanied by alerts on the display screen 46 and/or audio or haptic alerts that inform the operator that the other of the marine propulsion devices 14, 16 is being moved without any corresponding input on the operator's part. Such alerts would prevent the marine propulsion system 12 from taking unexpected action that the operator did not intend without first alerting the operator. This automatic feature, if provided, could be capable of being toggled ON or OFF by the operator via a button or display screen option at the operation console 38.

Figure 4:
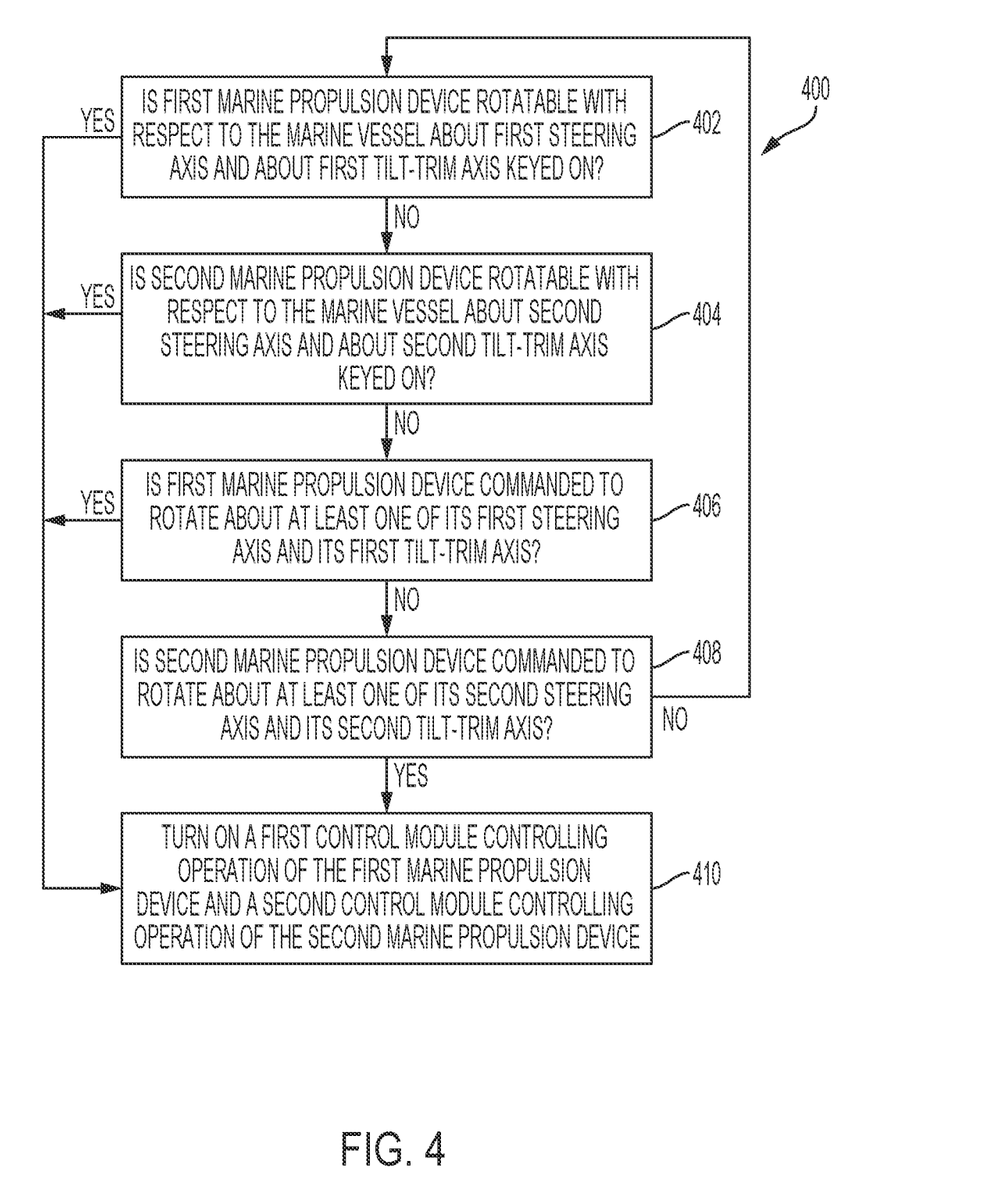
FIG. 4 shows a method for a marine propulsion system according to the present disclosure.

Now turning to FIG. 4, a method 400 for a marine propulsion system 12 for a marine vessel 10 will be described. The method includes determining at least one of the following: (a) whether a first marine propulsion device 14 rotatable with respect to the marine vessel 10 about at least one of a first steering axis 18 and a first tilt-trim axis 20 is keyed ON (see 402); (b) whether a second marine propulsion device 16 rotatable with respect to the marine vessel 10 about at least one of a second steering axis 22 and a second tilt-trim axis 24 is keyed ON (see 404); (c) whether the first marine propulsion device 14 is commanded to rotate about at least one of its first steering axis 18 and its first tilt-trim axis 20 (see 406); and (d) whether the second marine propulsion device 16 is commanded to rotate about at least one of its second steering axis 22 and its second tilt-trim axis 24 (see 408). If NO to all of 402, 404, 406, and 408 (or if NO to whichever determinations are made), the method returns to 402.

As shown at 410, in response to at least one of (a), (b), (c), and (d) being true (i.e., YES at 402, 404, 406, or 408), the method includes turning on a first control module 42 controlling operation of the first marine propulsion device 14 and a second control module 44 controlling operation of the second marine propulsion device 16. Note that the determinations at 402-408 can be made simultaneously or in any order, and the order shown herein is not limiting on the scope of the present disclosure. Note also that more than one of 402-408 may be true (YES) at one time and the method will continue to 410. Additionally, note that not all of the determinations at 402-408 need be made, and instead only one, two, or three of the determinations can be made according to the programming of the control algorithm.

The method may include measuring at least one of first and second steering positions of the respective first and second marine propulsion devices 14, 16 with steering sensors 66, 68 and first and second tilt-trim positions of the respective first and second marine propulsion devices 14, 16 with tilt-trim sensors 60, 62. The method may also include receiving the at least one of the first and second steering positions and the first and second tilt-trim positions at the first and second control modules 42, 44, respectively. In one example, the method includes measuring the first and second tilt-trim positions of the respective first and second marine propulsion devices 14, 16 with respective first and second accelerometers.

The method may include receiving a steering command to rotate one of the first and second marine propulsion devices 14, 16 about its respective first or second steering axis 18, 22; determining whether rotating the one of the first and second marine propulsion devices 14, 16 according to the steering command will cause the one of the first and second marine propulsion devices 14, 16 to collide with the other of the first and second marine propulsion devices 14, 16 based on at least one of the respective first or second steering position and the respective first or second tilt-trim position of the other of the first and second marine propulsion devices 14, 16; and in response to determining that rotating the one of the first and second marine propulsion devices 14, 16 according to the steering command will cause a collision, at least temporarily preventing the one of the first and second marine propulsion devices 14, 16 from rotating about its respective first or second steering axis 18, 22. Similarly, the method may include receiving a tilt-trim command to rotate one of the first and second marine propulsion devices 14, 16 about its respective first or second tilt-trim axis 20, 24; determining whether rotating the one of the first and second marine propulsion devices 14, 16 according to the tilt-trim command will cause the one of the first and second marine propulsion devices 14, 16 to collide with the other of the first and second marine propulsion devices 14, 16 based on at least one of the respective first or second steering position and the respective first or second tilt-trim position of the other of the first and second marine propulsion devices 14, 16; and in response to determining that rotating the one of the first and second marine propulsion devices 14, 16 according to the tilt-trim command will cause a collision, at least temporarily preventing the one of the first and second marine propulsion devices 14, 16 from rotating about its respective first or second tilt-trim axis 20, 24. As noted herein above, these determinations may also be made based on the requested or anticipated first or second steering position and first or second tilt-trim position of the one of the first and second marine propulsion devices 14, 16 that was commanded to rotate.

The method may also include generating an alert in response to:
   (1) one of the first and second marine propulsion devices 14, 16 being commanded to rotate about at least one of its respective first or second steering axis 18, 22 and its respective first or second tilt-trim axis 20, 24; and
   (2) determining that rotating the one of the first and second marine propulsion devices 14, 16 about the at least one of its respective first or second steering axis 18, 22 and its respective first or second tilt-trim axis 20, 24 will cause the one of the first and second marine propulsion devices 14, 16 to collide with the other of the first and second marine propulsion devices 14, 16 based on at least one of the respective first or second steering position and the respective first or second tilt-trim position of the other of the first and second marine propulsion devices 14, 16.

The method may include providing the operator of the marine propulsion system 12 an option on the display screen 46 to trim the other of the first and second marine propulsion devices 14, 16 up in response to (1) and (2). The method may include providing the operator of the marine propulsion system 12 an option on the display screen 46 to steer the other of the first and second marine propulsion devices 14, 16 away from the one of the first and second marine propulsion devices 14, 16 in response to (1) and (2).

The method may alternatively include automatically trimming one of the first and second marine propulsion devices 14, 16 up and steering the one of the first and second marine propulsion devices 14, 16 away from the other of the first and second marine propulsion devices 14, 16 in response to:

(a) the other of the first and second marine propulsion devices 14, 16 being commanded to rotate about at least one of its respective first or second steering axis 18, 22 and its respective first or second tilt-trim axis 20, 24; and (b) determining that rotating the other of the first and second marine propulsion devices 14, 16 about the at least one of its respective first or second steering axis 18, 22 and its respective first or second tilt-trim axis 20, 24 will cause the other of the first and second marine propulsion devices 14, 16 to collide with the one of the first and second marine propulsion devices 14, 16 based on at least one of the respective first or second steering position and the respective first or second tilt-trim position of the one of the first and second marine propulsion devices 14, 16.

In order to determine if movement of the one of the marine propulsion devices that is commanded to steer and/or tilt/trim will cause a collision with the other of the marine propulsion devices, as noted herein above, the control module 40, 40a, 40b, 42, 44 will need to know the position of the stationary marine propulsion device. The control module 40, 40a, 40b, 42, 44 would also be able to predict the anticipated position of the moving marine propulsion device based on its current position and a commanded positional change, or based on a commanded desired steering or tilt/trim angle. The control module 40, 40a, 40b, 42, 44 may also have other data saved in its memory, such as the height of the marine propulsion devices on the transom, the mounting distance between the marine propulsion devices, and the dimensions (such as length) of the marine propulsion devices. The algorithms that determine whether collision would be likely may be programmed for the worst case scenario, such that there is a safety factor built in. In one example, the method of U.S. Pat. No. 8,818,587 may be used to determine if collision is likely.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

What is claimed is:

1. A method fora marine propulsion system for a marine vessel, the method being carried out by a control module and comprising:

determining whether a first marine propulsion device of the marine propulsion system is keyed ON, the first marine propulsion device having a first electronic control module controlling operation of a first engine; and in response to the first marine propulsion device being keyed ON, providing sufficient voltage to turn on a second electronic control module controlling operation of a second engine of a second marine propulsion device of the marine propulsion system;

wherein in response to being provided with sufficient voltage in response to the first marine propulsion device being keyed ON, the second electronic control module is configured to provide communication only of given parameters and control only of given outputs of the second marine propulsion device, and the second electronic control module is configured not to provide given functionality of the second marine propulsion device.

2. The method of claim 1, wherein the given functionality relates to fuel pumps, electrical loads, and diagnostics of the second marine propulsion device.

3. The method of claim 1, wherein in response to the first marine propulsion device being keyed ON, the first electronic control module is provided with the ability to control steering, trim, and diagnostics of the first marine propulsion device.

4. The method of claim 1, wherein the first marine propulsion device is rotatable with respect to the marine vessel about at least one of a first steering axis and a first tilt-trim axis, and the second marine propulsion device is rotatable with respect to the marine vessel about at least one of a second steering axis and a second tilt-trim axis, and the method further comprises:

measuring at least one of first and second steering positions and first and second tilt-trim positions of the respective first and second marine propulsion devices; and receiving the at least one of the first and second steering positions and the first and second tilt-trim positions at the first and second electronic control modules, respectively.

5. The method of claim 4, further comprising:

receiving a steering command to rotate one of the first and second marine propulsion devices about its respective first or second steering axis;

determining whether rotating the one of the first and second marine propulsion devices according to the steering command will cause the one of the first and second marine propulsion devices to collide with the other of the first and second marine propulsion devices based on at least one of the respective first or second steering position and the respective first or second tilt-trim position of the other of the first and second marine propulsion devices; and in response to determining that rotating the one of the first and second marine propulsion devices according to the steering command will cause a collision, at least temporarily preventing the one of the first and second marine propulsion devices from rotating about its respective first or second steering axis.

6. The method of claim 4, further comprising:

receiving a tilt-trim command to rotate one of the first and second marine propulsion devices about its respective first or second tilt-trim axis;

determining whether rotating the one of the first and second marine propulsion devices according to the tilt-trim command will cause the one of the first and second marine propulsion devices to collide with the other of the first and second marine propulsion devices based on at least one of the respective first or second steering position and the respective first or second tilt-trim position of the other of the first and second marine propulsion devices; and in response to determining that rotating the one of the first and second marine propulsion devices according to the tilt-trim command will cause a collision, at least temporarily preventing the one of the first and second marine propulsion devices from rotating about its respective first or second tilt-trim axis.

7. The method of claim 1, wherein a first key input is provided in signal communication with the first electronic control module, and the method further comprises:

keying ON the first marine propulsion device in response to the first key input being turned ON.

8. The method of claim 1, wherein the first electronic control module comprises a high side output, and a line electrically connects the high side output to the second electronic control module, and the method further comprises:

sending +12 volts over the line in response to the first marine propulsion device being keyed ON.

9. A marine propulsion system for a marine vessel, the marine propulsion system comprising:

a first marine propulsion device coupled to the marine vessel, the first marine propulsion device having a first engine controlled by a first electronic control module; and a second marine propulsion device coupled to the marine vessel, the second marine propulsion device having a second engine controlled by a second electronic control module;

wherein, in response to the first marine propulsion device being keyed ON, the second electronic control module of the second marine propulsion device is turned ON; and wherein in response to being turned ON in response to the first marine propulsion device being keyed ON, the second electronic control module is configured to provide communication only of given parameters and control only of given outputs of the second marine propulsion device, and the second electronic control module is configured not to provide given functionality of the second marine propulsion device.

10. The marine propulsion system of claim 9, wherein the given functionality relates to fuel pumps, electrical loads, and diagnostics of the second marine propulsion device.

11. The marine propulsion system of claim 9, wherein the first marine propulsion device is rotatable with respect to the marine vessel about at least one of a first steering axis and a first tilt-trim axis, and the second marine propulsion device is rotatable with respect to the marine vessel about at least one of a second steering axis and a second tilt-trim axis, and the marine propulsion system further comprises:

first and second steering sensors on the first and second marine propulsion devices, respectively, that measure first and second steering positions of the respective first and second marine propulsion devices; and first and second tilt-trim sensors on the first and second marine propulsion devices, respectively, that measure first and second tilt-trim positions of the respective first and second marine propulsion devices;

wherein the first electronic control module receives the first steering position and the first tilt-trim position from the first steering sensor and the first tilt-trim sensor, respectively, only when the first electronic control module is turned ON; and wherein the second electronic control module receives the second steering position and the second tilt-trim position from the second steering sensor and the second tilt-trim sensor, respectively, only when the second electronic control module is turned ON.

12. The marine propulsion system of claim 11, wherein, in response to determining that rotating one of the first and second marine propulsion devices about its respective first or second steering axis will cause the one of the first and second marine propulsion devices to collide with the other of the first and second marine propulsion devices based on at least one of the respective first or second steering position and the respective first or second tilt-trim position of the other of the first and second marine propulsion devices, the one of the first and second marine propulsion devices is at least temporarily prevented from rotating about its respective first or second steering axis.

13. The marine propulsion system of claim 11, wherein, in response to determining that rotating one of the first and second marine propulsion devices about its respective first or second tilt-trim axis will cause the one of the first and second marine propulsion devices to collide with the other of the first and second marine propulsion devices based on at least one of the respective first or second steering position and the respective first or second tilt-trim position of the other of the first and second marine propulsion devices, the one of the first and second marine propulsion devices is at least temporarily prevented from rotating about its respective first or second tilt-trim axis.

14. The marine propulsion system of claim 9, further comprising a first key input in signal communication with the first electronic control module;

wherein the first marine propulsion device is keyed ON in response to the first key input being turned ON.

15. The marine propulsion system of claim 9, further comprising a line that electrically connects a high side output of the first electronic control module to the second electronic control module;

wherein the first electronic control module is configured to send +12 volts over the line in response to the first marine propulsion device being keyed ON.

16. The marine propulsion system of claim 9, wherein the second engine is not started when the second electronic control module is turned ON in response to the first marine propulsion device being keyed ON.

\* \* \* \* \*

UNITED STATES PATENT AND TRADEMARK OFFICE
CERTIFICATE OF CORRECTION

PATENT NO. : 11,586,207 B1
APPLICATION NO. : 17/731803
DATED : February 21, 2023
INVENTOR(S) : David J. Belter, Matthew W. Snyder and Brad E. Taylor It is certified that error appears in the above-identified patent and that said Letters Patent is hereby corrected as shown below:

In the Claims

Claim 1, Column 14, Line 20, after "method" delete "fora" and substitute therefor -- for a --.

Signed and Sealed this
Twenty-first Day of March, 2023

Katherine Kelly Vidal
Director of the United States Patent and Trademark Office